(12) United States Patent
Ananthapur Bache et al.

(10) Patent No.: US 11,048,621 B2
(45) Date of Patent: Jun. 29, 2021

(54) ENSURING SOURCE CODE INTEGRITY IN A COMPUTING ENVIRONMENT

(71) Applicant: INTERNATIONAL BUSINESS MACHINES CORPORATION, Armonk, NY (US)

(72) Inventors: Vijay Kumar Ananthapur Bache, Karnataka (IN); Padmanabha Venkatagiri Seshadri, Mysore (IN); Vijay Ekambaram, Chennai (IN); Saravanan Sadacharam, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 16/677,153

(22) Filed: Nov. 7, 2019

(65) Prior Publication Data
US 2021/0141717 A1 May 13, 2021

(51) Int. Cl.
*G06F 11/36* (2006.01)
*G06F 8/61* (2018.01)
*G06F 11/30* (2006.01)

(52) U.S. Cl.
CPC ............ *G06F 11/3688* (2013.01); *G06F 8/61* (2013.01); *G06F 11/302* (2013.01); *G06F 11/3684* (2013.01); *G06F 11/3692* (2013.01)

(58) Field of Classification Search
None
See application file for complete search history.

(56) References Cited

U.S. PATENT DOCUMENTS

| | | | |
|---|---|---|---|
| 9,118,709 B2 * | 8/2015 | Oliphant | H04L 63/1416 |
| 2015/0378692 A1 * | 12/2015 | Dang | G06F 8/33 717/106 |
| 2017/0147298 A1 * | 5/2017 | Ramanathan | G06F 8/36 |
| 2018/0129544 A1 * | 5/2018 | Ekambaram | G06F 9/541 |
| 2018/0143826 A1 | 5/2018 | Crabtree et al. | |
| 2018/0276372 A1 * | 9/2018 | Crabtree | H04L 63/1433 |
| 2018/0278505 A1 * | 9/2018 | Sarin | H04W 12/08 |

(Continued)

OTHER PUBLICATIONS

Ichinco, Towards Better Code Snippets: Exploring How Code Snippet Recall Differs with Programming Experience, 2017, IEEE Symposium on Visual Languages and Human-Centric Computing (VL/HCC) (Year: 2017).*

(Continued)

*Primary Examiner* — Hossain M Morshed
(74) *Attorney, Agent, or Firm* — Heslin Rothenberg Farley & Mesiti P.C.; Michael A. Petrocelli, Esq.

(57) ABSTRACT

A method, computer program product, and a system where a processor(s) identifies a partial signature in a code snippet from a source. The processor(s) data mines, based on the partial signature, websites and repositories to identify and extract metadata relevant to the source. The processor(s) generates, based on a first portion of the metadata, an installation package to install the code base for execution in a test environment of a target computing system. The processor(s) generates, based on a second portion of the metadata, an access contract (expected accesses of the code snippet) during execution on the target system. The processor(s) deploys the installation package in the test environment and executes the code base.

20 Claims, 9 Drawing Sheets

(56) References Cited

U.S. PATENT DOCUMENTS

2019/0146902 A1* 5/2019 Jiang .................. G06F 11/3684
717/129
2020/0074049 A1* 3/2020 Ekambaram ............ G06F 21/14

OTHER PUBLICATIONS

Mell, "The NIST Definition of Cloud Computing", 2011, National Institute of Standards and Technology (Year: 2011).*

Mell et al., "The NIST Definition of Cloud Computing", National Institute of Standards and Technology, U.S. Dept. of Commerce, NIST Special Publ. 800-145, Sep. 2011, 7 pages.

* cited by examiner

ENSURING SOURCE CODE INTEGRITY IN A COMPUTING ENVIRONMENT

BACKGROUND

Re-use of existing code in a project (application, database, service, etc.) developed by someone other than the developer(s) programming the project is a common practice in software development and design. By leveraging existing tools, available from third parties, including open source tools, a developer can reduce software life cycle by reducing the development effort. These tools can be integrated into and existing integrated development environments (IDEs) and/or used as standalone desktop tools. The same code can be utilized multiple times within the same computing environment. Utilizing these tools is also attractive from a cost standpoint because a company could leverage existing development workforce by utilizing these existing tools without requiring new or specialized expertise to develop the functionalities provided by these tools. The integration of the tools is a largely manual process and does not require the expertise of a subject matter experts in computing architectures.

SUMMARY

Shortcomings of the prior art are overcome and additional advantages are provided through the provision of a method for ensuring integrity of code in a target environment. The method includes, for instance: identifying, by one or more processors, a partial signature in a code snippet from a source, wherein the code snippet identifies the source, and wherein the code snippet was injected into a code base to be executed in a production environment of a target computer system; data mining, by the one or more processors, based on the partial signature, one or more websites and one or more source code repositories to identify and extract metadata relevant to the source; generating, by the one or more processors, based on a first portion of the metadata, an installation package to install the code base for execution in a test environment of the target computing system; generating, based on a second portion of the metadata, an access contract, wherein the access contract comprises expected accesses of the code snippet, during execution on the target system; deploying, by the one or more processors, the installation package in the test environment; and executing, by the one or more processors, the code base in the test environment.

Shortcomings of the prior art are overcome and additional advantages are provided through the provision of a computer program product for ensuring integrity of code in a target environment. The computer program product comprises a storage medium readable by a processing circuit and storing instructions for execution by the processing circuit for performing a method. The method includes, for instance: identifying, by one or more processors, a partial signature in a code snippet from a source, wherein the code snippet identifies the source, and wherein the code snippet was injected into a code base to be executed in a production environment of a target computer system; data mining, by the one or more processors, based on the partial signature, one or more websites and one or more source code repositories to identify and extract metadata relevant to the source; generating, by the one or more processors, based on a first portion of the metadata, an installation package to install the code base for execution in a test environment of the target computing system; generating, based on a second portion of the metadata, an access contract, wherein the access contract comprises expected accesses of the code snippet, during execution on the target system; deploying, by the one or more processors, the installation package in the test environment; and executing, by the one or more processors, the code base in the test environment.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
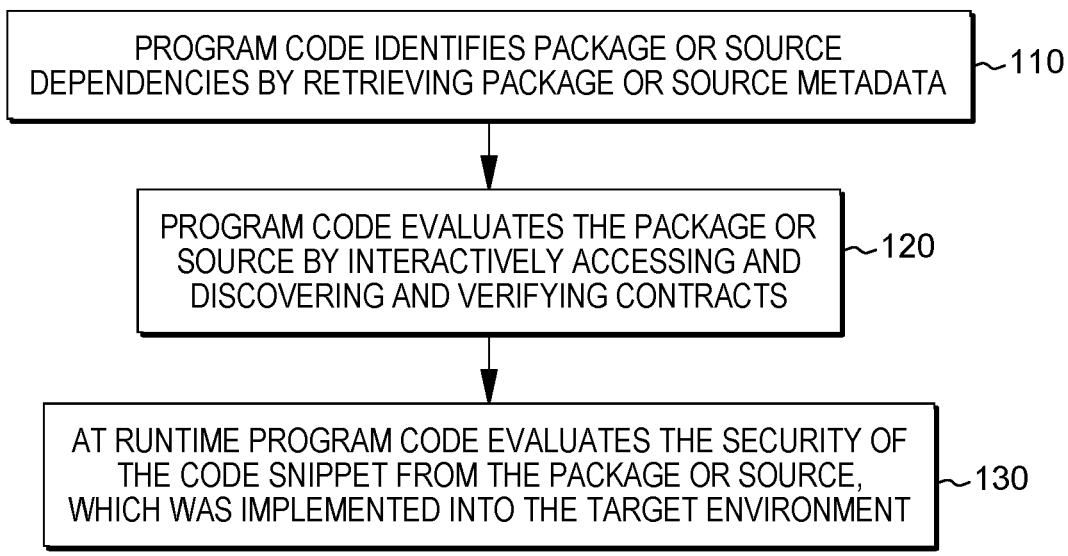
FIG. 1 is a workflow that illustrates certain aspects of some embodiments of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 7:
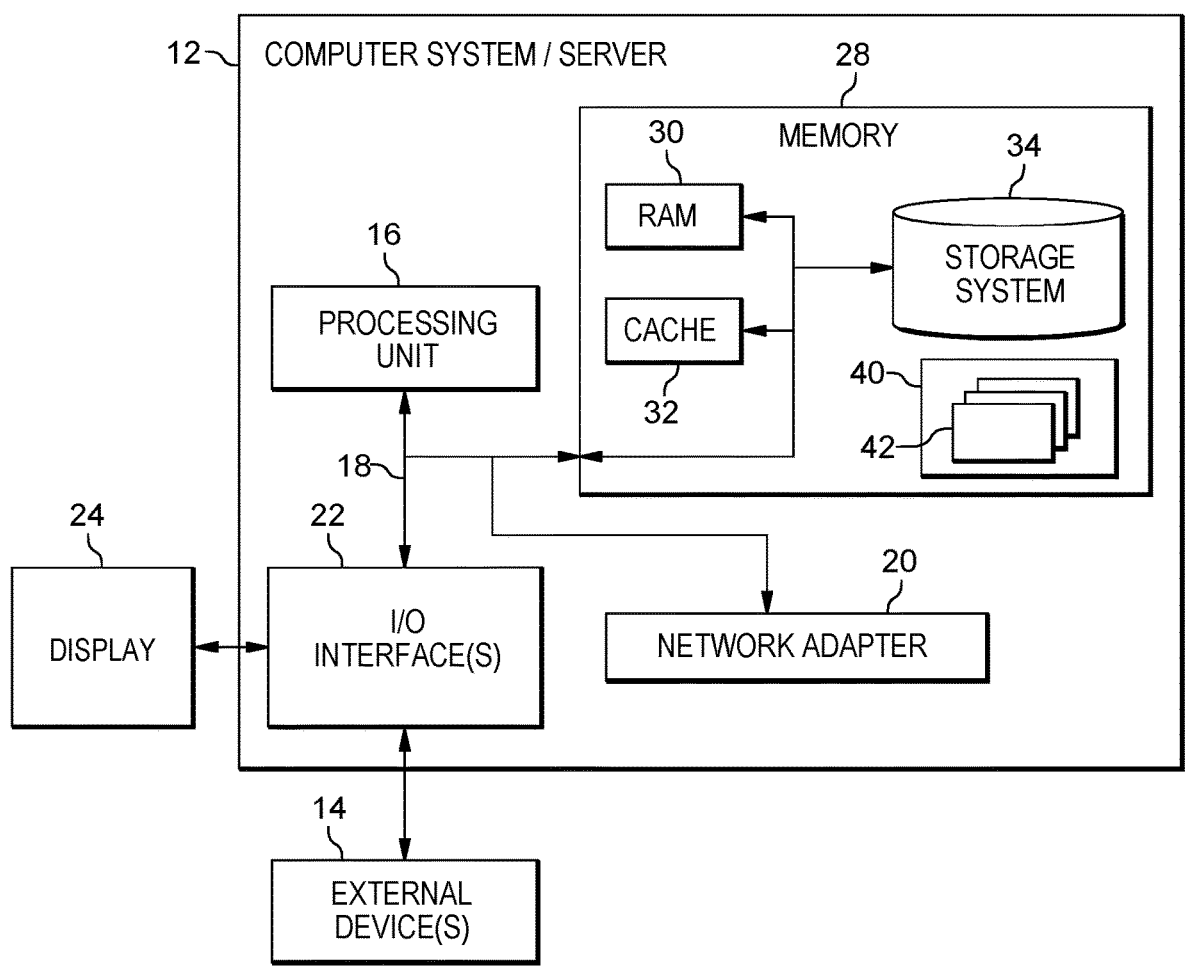
FIG. 7 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 7 as program/utility 40, having a set (at least one) of program modules 42, may be stored in memory 28. Throughout, the words "package" and "source" are both used to represent a repository or source of various third party software tools which can be utilized and integrated into a target environment by a developer or administrator. A common type of package or source is a software development kit (SDK), which is referenced herein as a non-limiting illustrative example.

Re-use of existing code in a project (application, database, service, etc.) developed by someone other than the developer(s) programming the project is a common practice in software development and design. For example, developers regularly utilize tools available in software development kits (SDKs) rather than developing the functionalities available in the tools that comprise these kits from scratch. A SDK is a collection of software development tools in one installable package. A SDK simplifies the application development process by including a compiler, debugger and sometimes, a software framework. Many SDKs are specific to a hardware platform and operating systems combination. Additionally, certain code snippets, many of which are available as open source or from a SDK, are integrated into existing applications. In a given IDE, code snippets from given tools can be utilized multiple times across many different applications, especially when these tools provide functionality that is desirable in many different contexts, including but not limited to, sending email, providing forms, submitting forms, and saving forms in a database, etc. Code re-use can be practiced internal to an entity as well. Because many developers often work in parallel and on different projects, they may not communicate and know that one developed a code snippet that could be useful to another. This lack of communication results in duplicative work. Provided that code snippets can be discovered, the possibilities for reuse and exploiting efficiencies through reuse can be increased. However, a drawback of using duplicative code throughout a given technical environment is that these tools, as all code, can be potentially used as a vehicle for a malicious attack. The propagation of a given code snippet or tool throughout various parts of an IDE, in different contexts, can increase the risk of these malicious attacks negatively impacting a given IDE and technical environment as a whole. Because, for example, a SDK can be used as a vehicle for a cyber-attack, mechanisms are useful that protect environments from code reused within these environments, including code snippets from outside sources (including SDKs) where the quality of the source is unknown or unclear.

Embodiments of the present invention include a computer-implemented method, a computer program product, and a computer system where program code executing on at least one processor enables a method for securing applications from vulnerabilities in code snippets copied from external sources (e.g., open source SDKs). In embodiments of the present invention, program code executing on one or more processors:

1) utilizes cognitive analysis of code snippets from a tool (e.g., from an SDK or other outside source) to resolve all dependencies for the tool within a target system (e.g., by analyzing/parsing configuration scripts, readme files, SDK documentation, etc.); and 2) screens and identifies any vulnerabilities or discrepancies in the tool, including for non-functional requirements (NFRs).

Specifically, in embodiments of the present invention, in order to determine that code (e.g., a code snippet, a tool) is being reused safely within a given target environment, the program code automatically discovers access contracts in code repositories and validates the access contracts to ensure safe reuse of the code. This code can originate from a source outside of the target environment, including but not limited a third party or may be available as open source.

In order to validate the safety of a code snippet in this manner, the program code, in some embodiments of the present invention:

1) mines various package or source (e.g., SDK) candidate metadata within a code snippet by using source code of the code snippet and source code from repositories, which share the same package or source as the code snippet; the package or source candidate meta-data include dependencies, usage pattern and configuration management data;

2) performs web crawling, including on public forums, to detect various possible vulnerabilities in the code snippet to capture various unverified user inferences on the code snippet;

3) creates an installation plan and installs a selected plan in an isolated testing environment (e.g., a sandbox) by matching the dependencies obtained from the package or source candidate metadata with the code snippet;

4) generates the aforementioned access contracts based on the vulnerabilities by augmenting the code snippet with code to monitor an execution within the sandbox environment (e.g., wrapping the code snippet is jacket code); and/or 5) verifies and augments the access contracts for safe execution of the code snippet.

Embodiments of the present invention are inextricably tied to computing. As discussed above, the use of code from outside sources, opening the target systems in which it is implemented, to security vulnerabilities, is an issue that is unique to computing. The aspects of some embodiments of the present invention are technical approaches to this issue, including, but not limited to, generating a wrapper/jacket for the code, which is then executed with the code, in the target environment, such that when the code is executed, to monitor accesses of the code to identify unexpected behaviors in real-time. In order to generate this jacket, the program code mines various sources of metadata to generate an access contract that represents an expectation of code behavior, which is then utilized by the program code, to generate the jacket. Thus, embodiments of the present invention generate and implement a security mechanism that is inextricably related to computing that secures code executed in a target environment.

Embodiments of the present invention provide a significant advantage over existing methods of monitoring accesses of code snippets, including those from third parties and SDKs, in a target system (a system into which the code has been implemented). Existing solutions for monitoring accesses do not include at least the following aspects of some embodiments of the present invention, which are discussed below:

1) automatic source detection and metadata discovery for these code snippets;

2) interactive access contract (i.e., permitted or expected accessed made by the code snippet during execution) discovery and verification for elements of a packet or source within the code snippet; and 3) generating wrappers (e.g., jackets) and wrapping the code during execution to monitor contract breaches during runtime.

FIG. 1 is a workflow 100 that illustrates an overview of various aspects of some embodiments of the present invention. Program code in embodiments of the present invention executing on one or more processors, identifies package or source dependencies by retrieving package or source metadata (110). In some embodiments of the present invention, in order to identify these dependencies, the program code scans sources including, but not limited to documentation, readme, code, etc. The program code can also search or pre-fetch code for a package or a source used with a code snippet from the package or source (or that calls others aspects of the package or source), to identify sources and dependencies. The program code evaluates the package or source by interactively accessing and discovering and verifying contracts (120). This interactive discovery includes the program code discovering and verifying probable resources accessed by the (injected) code snippet. In this manner, the program code evaluates the package or source for privacy, security vulnerabilities, and bugs in the target environment. At runtime, the program code evaluates the security of the code snippet from the package or source, which was implemented into the target environment (130). In some embodiments of the present invention, the program code augments the code snippet with additional code (e.g., a jacket), such that a security check is initiated at runtime. The additional code is a mechanism that tests leaks in privacy while passing input and security threats, due to outputs from the package or source.

Figure 2:
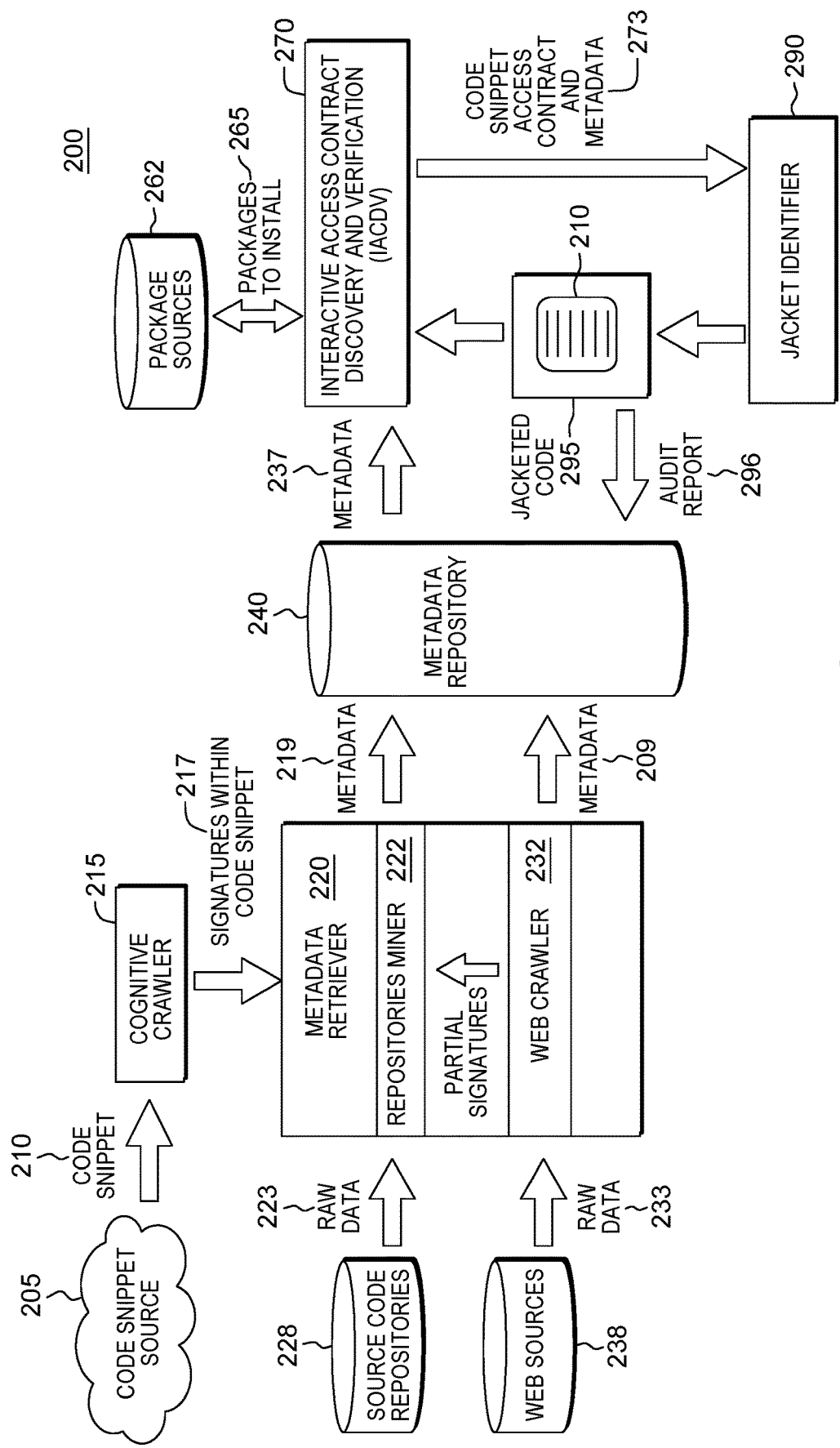
FIG. 2 depicts a combination workflow and technical architecture that illustrates various aspects of some embodiments of the present invention.

FIG. 2 is a combination workflow and technical architecture 200 that illustrates certain aspects of some embodiments of the present invention. As illustrated in FIG. 2, in some embodiments of the present invention, program code executing on one or more processors auto-discovers access contracts (which are generated by the program code, as described herein), which are initially bootstrapped from package or source candidate meta-data by the program code, and by the program code web crawling public forums. The program code auto-validates and fine-tunes the access contracts using automated test environment execution. The program code injects the auto-validated and fine-tuned access contracts into a code augmentation vehicle, such as a snippet jacket, for use at the execution of the contracts at runtime, to ensure safe reuse of third party or open source code snippets. For illustrative purposes only, reference is made to various aspects of the workflow 100 of FIG. 1, in the discussion of FIG. 2.

For ease of understanding, various aspects of the disclosed method, performed by the program code, are separated, in FIG. 2, into different modules, based on functionality (e.g., cognitive crawler, metadata retriever, interactive contract discovery and verification, jacket generator, etc.). The separation of these functions, visually, is done for illustrative purposes, only. The program code can comprise one or more programs or modules. This configuration in FIG. 2 was selected merely as an example in order to describe various aspects in a clear, illustrative, manner.

Referring to FIG. 2, in some embodiments of the present invention, in order for the program code to identify package or source (e.g., SDK) dependencies by retrieving package or source metadata (FIG. 1, 110), a user selects a code snippet 210 to investigate. The user can designate this snippet through a user interface of a computing node communicatively coupled to the one or more processors executing the program code. The original source 205 of the code snippet 210 is a package or source or other third party, before it is/was incorporated into a target system by a developer or administrator. SDK is a non-limiting example of an original source 205 for the code snippet 210, although another type of repository or package or source could also comprise the source 205. However, in order to test and protect the code snippet 210, in accordance with various aspects of the present invention, the program code can obtain the code snippet 210 from a source other than the original source 205, which can be the a code repository in the target system into which the code snippet 210 was incorporated or is to be incorporated, or another computing system into which the code snippet 210 was incorporated. In some embodiments of the present invention, a user copies the code snippet 210 and pastes it into graphical user interface (GUI) from which, upon submission, the program code obtains the code snippet 210 and executes a cognitive analysis (e.g., FIG. 1, 110).

In order for the program code to determine package or source dependencies, the program code retrieves package or source metadata (FIG. 1, 110). To this end, the program code, as a cognitive crawler 215, crawls various code snippet sources to extract metadata of the original source 205 of the code snippet 210. The metadata can include, but is not limited to, source signature, usage patterns, dependencies, reported vulnerabilities, security and privacy issues. In some embodiments of the present invention, program code illustrated as a cognitive crawler 215 identifies a signature 217 within the code snippet 210, which the program code, illustrated as the metadata retriever 220, utilizes to retrieve the source 205 metadata. To retrieve the metadata 220, the program code mines (e.g., repositories miner 222) source code repositories 228 and crawls (e.g., web crawler 232) publicly available web sources 238.

In mining the source code repositories 228, the program code (e.g., repositories miner 222) can identify aspects including, but not limited to dependencies, signatures and cognitive usage patterns. The program code extracts raw data 223 from the source code repositories 228, based on employing various mining methods.

To locate dependencies in the source code repositories 228, the program code parses accessible files, including but not limited to, documentation text files (e.g., ReadMe files) to extract out segments containing installation procedures and any dependency pre-requisites. The program code identifies relevant files in the source code repositories 228 based on utilizing one or more of the signature 217 and/or the code snippet 210 itself. In some embodiments of the present invention, the program code infers dependencies by parsing and/or installing identified configuration scripts and/or installation scripts (e.g., shell scripts) in the source code repositories 228, for dependencies to be installed.

In some embodiments of the present invention, the program code can employ an existing parsing tool to identify the signature 217 of the source 205 in the source code repositories 228. The signature 217 can include, but is not limited to, input types, output types and/or method names. In some embodiments of the present invention, upon identifying elements of the signature 217, the program code encodes the elements (the signature 217) as one or more fixed size vectors. In some embodiments of the present invention, the program code utilizes an existing encoding scheme, including but not limited to md5 (message-digest algorithm), to encode the type strings organized as a delimited array of strings.

Figure 3:
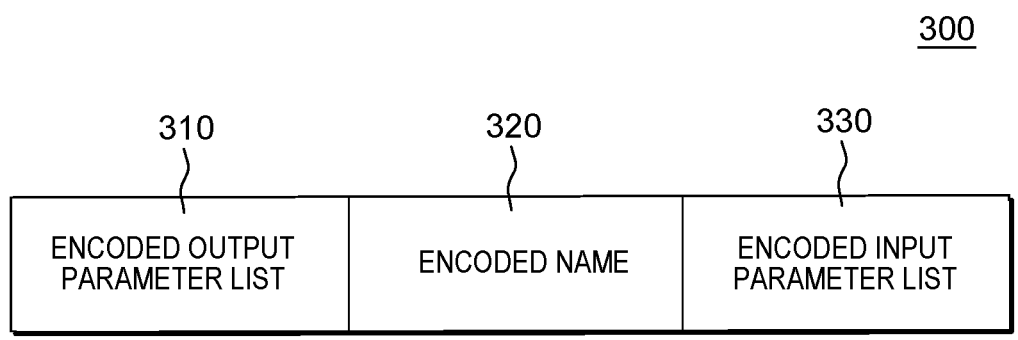
FIG. 3 depicts aspects of is an example of a type of delimited array generated in some embodiments of the present invention.

FIG. 3 is an example of this type of delimited array 300. This array 300, generated by the program code includes: an encoded output parameter list 310, the encoded name 320 of the source (e.g., SDK), which can include the full name resolution, including namespace, class, and method names, and the encoded input parameter list 330.

Returning to FIG. 2, in some embodiments of the present invention, the program code detects cognitive usage patterns of a source 205 within a library and/or class in the source code repositories 228, or at a different location within the source code repositories 228. The program code can detect these dependencies, in some cases, by prefetching them and installing them, when one or more of them are queried, by the program code. The methods utilized to capture usage patterns, by the program code, can vary depending upon the source type for the code snippet 210. In the SDK example, the program code can capture usage patterns utilizing a co-invocation matrix of size N×N, which the program code creates for N SDK such that the entry (i,j) represents the number of times SDK i and j were invoked within the same method. The program code can also capture usage patterns by searching the library code in the source code repositories 228 using feature vectors.

Figure 4:
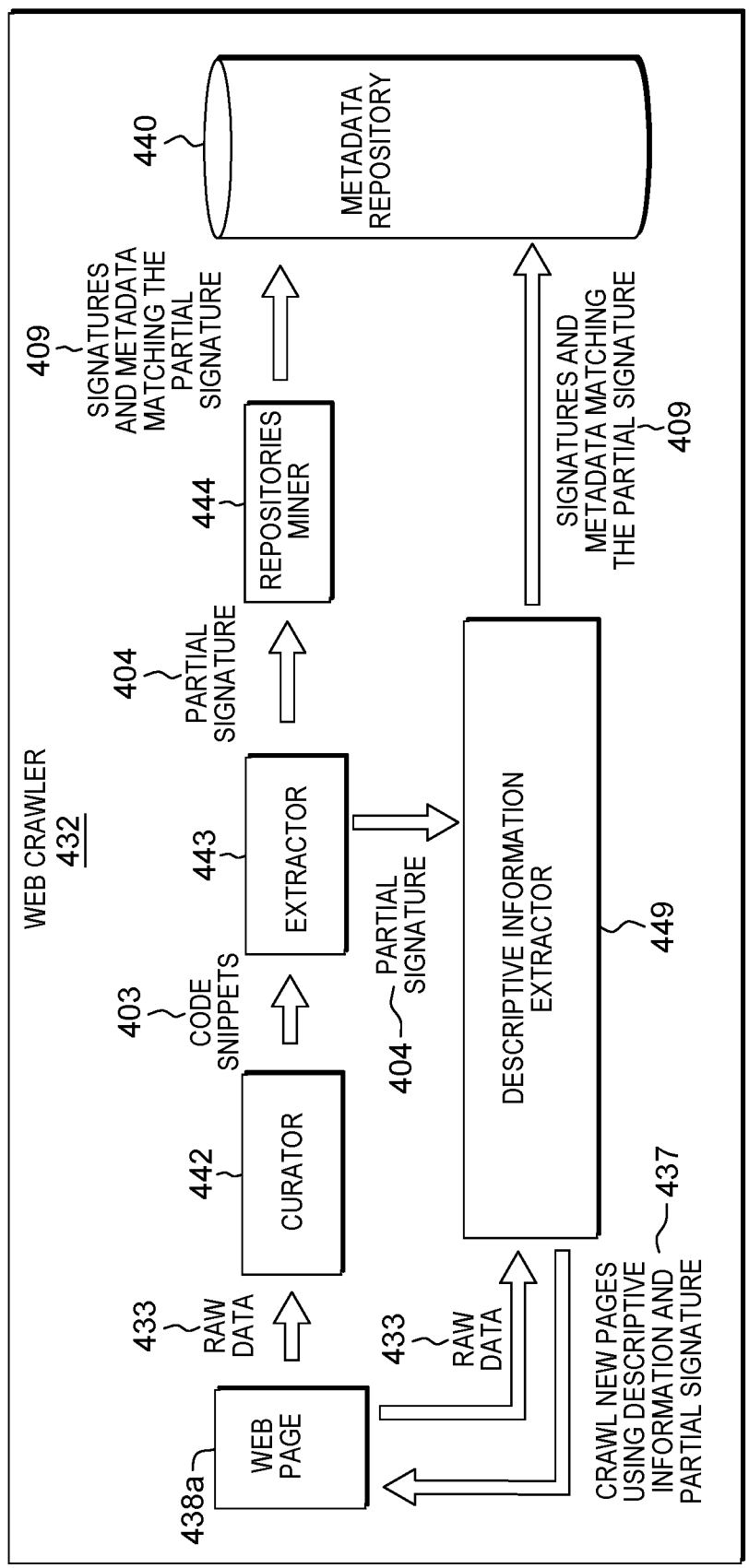
FIG. 4 depicts a combination workflow and technical architecture that illustrates various aspects of some embodiments of the present invention.

FIG. 4 is also a combination workflow and technical architecture and specifically, provides a more detailed overview of the program code referred to in FIG. 2, as the web crawler 232, which mines raw data 233 from publicly available web sources 238. FIG. 4 illustrates the program code of the web crawler 432 accessing a given webpage (the web crawler 432 accesses publicly available data sources). Utilizing functionality similar to the program code of the repositories miner 222 (FIG. 2), the web crawler 432 accesses publicly available web sources 238 (FIG. 2), such as the web page 438a, for signatures within code snippets and also any metadata like usage patterns, dependencies, reported vulnerabilities, security and privacy issues, that can be obtained from comments and/or descriptions accompanying these code snippets. Stack overflow is an example of a forum or web page 438a that can be accessed by the program code for signatures. Because of the diversity of data types that the program code mines for data when accessing publicly available data sources like web page 438a, the program code, in some embodiments of the present invention, utilizes existing cognitive analysis tools, such as existing cognitive agents, for data mining.

One such cognitive agent that can be utilized in embodiments of the present invention is IBM Watson®. IBM Watson® is a registered trademark of International Business Machines Corporation, Armonk, N.Y., US. For example, in some embodiments of the present invention, the program code interfaces with the application programming interfaces (APIs) that are part of a known cognitive agent, such as the IBM Watson® Application Program Interface (API), a product of International Business Machines Corporation, to identify signatures of a code snippet and/or a code snippet on publicly available web sources 238 to locate relevant metadata, including but not limited to, usage patterns, dependencies, reported vulnerabilities, security and/or privacy issues. For example, two APIs that can be utilized in embodiments of the present invention include, but are not limited to IBM Watson® Natural Language Classifier (NLC) and IBM Watson® Natural Language Understanding. As understood by one of skill in the art, the IBM Watson® APIs are only provided to offer an example of possible APIs that can be integrated into embodiments of the present invention and to illustrate the functionality of the program code in embodiments of the present invention, whether through integration of an existing cognitive engine or not.

In some embodiments of the present invention, the cognitive natural language processing (NLP) capabilities of the program code are implemented as a machine learning system that includes a neural network (NN). In certain embodiments of the present invention the program code utilizes supervised, semi-supervised, or unsupervised deep learning through a single- or multi-layer NN to correlate the code snippet 210 (FIG. 2) with raw data that comprises source 205 (FIG. 2) metadata, from unstructured and structured data available on publicly available web sources 238 (FIG. 2). The program code utilizes resources of the NN to identify and weight connections from the code snippet 210 (FIG. 2) and signature 217 (FIG. 2) to determine whether raw data from unstructured and structured data available on publicly available web sources 238 (FIG. 2) is relevant to the source 205 (FIG. 2). For example, the NN can identify certain keywords, including partial signatures, which indicate a relevance to the source 205.

As understood by one of skill in the art, neural networks are a biologically-inspired programming paradigm which enable a computer to learn from observational data. This learning is referred to as deep learning, which is a set of techniques for learning in neural networks. Neural networks, including modular neural networks, are capable of pattern recognition with speed, accuracy, and efficiency, in situation where data sets are multiple and expansive, including across a distributed network of the technical environment. Modern neural networks are non-linear statistical data modeling tools. They are usually used to model complex relationships between inputs and outputs or to identify patterns in data (i.e., neural networks are non-linear statistical data modeling or decision making tools). In general, program code utilizing neural networks can model complex relationships between inputs and outputs and identify patterns in data. Because of the speed and efficiency of neural networks, especially when parsing multiple complex data sets, neural networks and deep learning provide solutions to many problems in image recognition, speech recognition, and natural language processing (NLP). Thus, by utilizing an NN the program code can identify metadata like usage patterns, dependencies, reported vulnerabilities, security and privacy issues, relevant to the source 205 (FIG. 2).

Referring to FIG. 4, the program code of the web crawler 432 crawls pages, such as the depicted web page 438a, and identifies raw data that is relevant to the source 205 (FIG. 2). The web crawler 432 program code can utilize descriptive information and/or at least a partial signature 437 to identify the raw data 433.

In some embodiments of the present invention, the web crawler 432 program code captures various unverified user inferences on to code snippet 205 (FIG. 2). The program code thus validates the raw data 433 before storing it in a catalog of signature and metadata relevant to the source 205 (FIG. 2), referred to as a metadata repository 440 (e.g., FIG. 2, 240). In some embodiments of the present invention, the program code verifies that the raw data 433 mined from the web page 438a by curating 442 the raw data 433 to extract code snippets 403 and then to extract 443 a partial signature 404 from the code snippets 403. The extracted 443 partial signature can be provided to program code comprising a repositories miner 444, which, in a similar manner as the program code comprising the repositories miner 222 (FIG. 2) mining the source code repositories 228 (FIG. 2), identifies, in the raw data 433, which has been verified through the curation 442 and extraction 443, using the partial signature 404, signatures, and metadata matching the partial signature 409. The program code of the extractor 443 can also provide the partial signature 404 to program code comprising a descriptive information extractor 449.

In some embodiments of the present invention, web crawler 432 program code utilizes the raw data 433, descriptive information, and the partial signature 404 to crawl additional pages (e.g., FIG. 2, 238). The program code can retain the signatures and metadata matching the partial signature 409 from the additional pages (e.g., FIG. 2, 238)

in the metadata repository 440. In some embodiments of the present invention, the program code accessing the web sources 238 (FIG. 2) infers dependencies by parsing and/or installing identified configuration scripts and/or installation scripts (e.g., shell scripts) in the source code web sources 238 (FIG. 2), for dependencies to be installed.

Referring to FIG. 2, once the metadata 209 219 from the metadata retriever 220 has been saved by the program code in the metadata repository 240, the program code performs various aspects on the consolidated metadata 237. This portion of the program code is referred to as the interactive access contract discovery and verification (IACDV) module 270. The functionality of the program code comprising the IACDV 270 is further detailed in FIG. 5.

As illustrated in FIG. 1 at runtime, the program code evaluates the security of the code snippet from the package or source, which was implemented into the target environment (130). In order to evaluate the code snippet, the program code creates access contracts based on the vulnerabilities (e.g., in the metadata), wraps the code snippet with a jacket code to monitor an execution within the sandbox environment, and verifies and augments the access contracts for safe execution of the code snippet. This aspect is illustrated in more detail in FIG. 5, while FIG. 6 illustrates the generation and operation of the jacket code.

Figure 5:
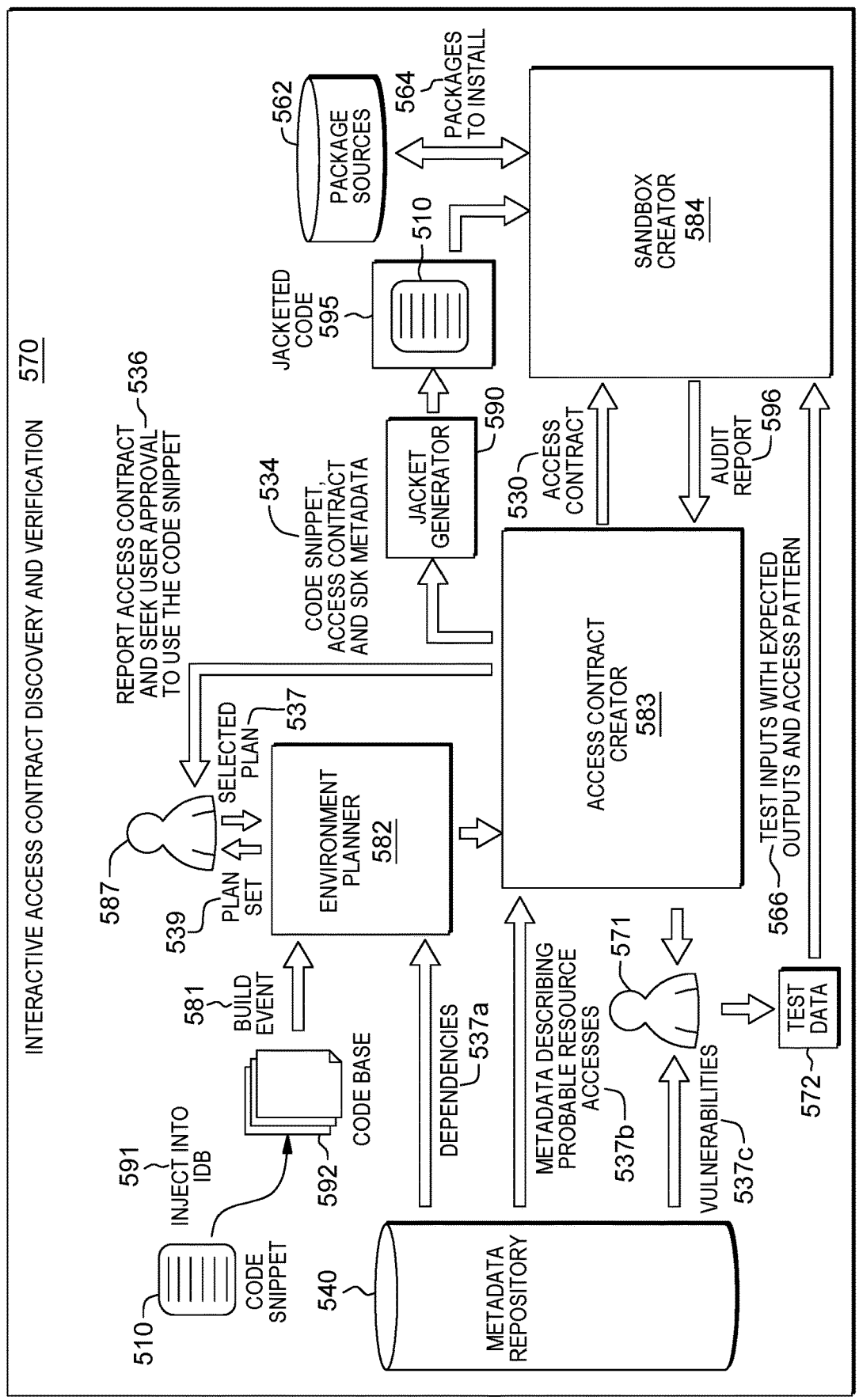
FIG. 5 depicts a combination workflow and technical architecture that illustrates various aspects of some embodiments of the present invention.
Figure 6:
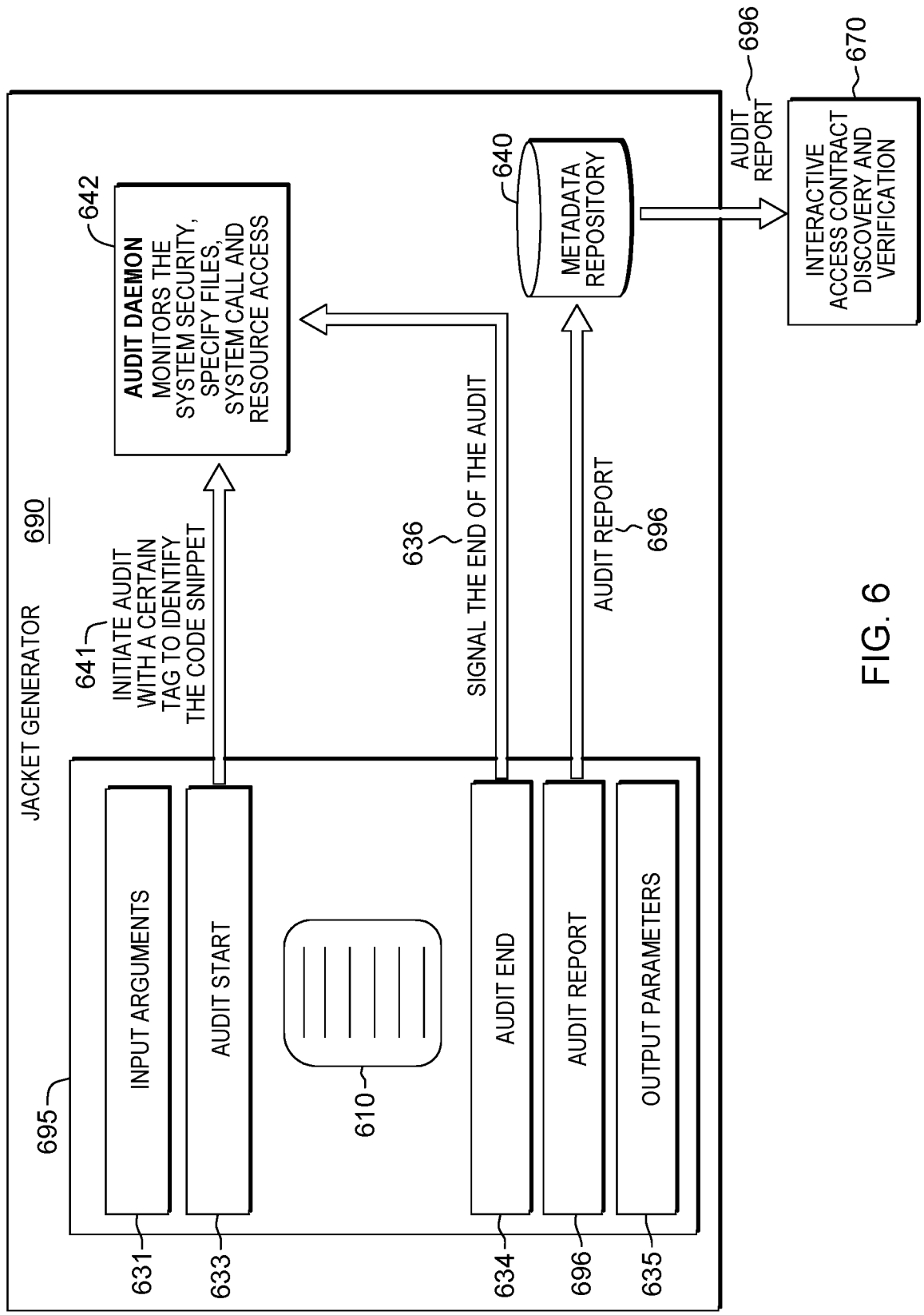
FIG. 6 depicts a combination workflow and technical architecture that illustrates various aspects of some embodiments of the present invention.

FIG. 5 is a combination workflow and technical architecture that depicts the program code discovering and verifying the probable resources accessed by the injected code snippet 510 (FIG. 2, 210). In FIG. 5, the program code evaluates the source by interactively accessing, discovering, and verifying contracts (e.g., FIG. 1, 120). As illustrated in FIG. 5, in embodiments of the present invention, the program code generates a set 539 of installation plans 582, and installs a (user or process) selected plan 537 in a program code generated 584 sandbox (testing) environment, which can be virtual. In installing the plan 537, the program code utilizes the source (e.g., FIG. 2, 205) dependency metadata 537*a* obtained by the program code and stored in the metadata repository 540. In addition to the dependency metadata 537*a* (i.e., dependencies for source-originating code in the code snippet), the metadata 537*a*-537*c* obtained from the metadata repository 540 can include, but is not limited to, metadata describing probable resource accesses 537*b*, and/ or vulnerabilities 537*c*, including but not limited to, exceptions, bugs, etc.

As illustrated in FIG. 5, based on the dependencies 537*a* obtained for the candidates matching the code snippet 510, the program code creates installation plans (i.e., installation set 539) and prompts a user to designate a selected plan 537 through a user interface 587. For ease of understanding, the program code that creates the plans 539 is depicted in FIG. 5 as an environmental planner 582 module. This program code creates separate installation plans (dependencies to set up) 539 for the various possible matches to the source (FIG. 2, 205) signature (FIG. 2, 217) and provides each separate plan to the user, via a user or process through an interface 587. The program code injects 591 the code snippet 510 into the code base 592 of the IDE. The program code (e.g., environmental planner 582) accesses this code base 592 to generate the separate installation plans 539. The program code obtains the selected plan 537 via the interface 587. The program code installs the selected plan 537 into a sandbox environment generated by the program code 584.

The program code creates access contracts. In some embodiments of the present invention, the program code obtains metadata describing probable accesses 537*b* as well as the installation plan 539 from the environment planner 582 program code. The program code generates an initial access contract based on the metadata 537, including the accesses 537*b* and vulnerabilities 537*c*. The access contract 530 comprises a list of probable resource access requests (e.g., r/w disk, i/w network, data source, etc.) of the code snippet 510. The program code updates this access contract 530 based on an audit report 596 obtained from execution of the code snippet 510 in the sandbox (virtual test environment). During the execution in the sandbox, the program code can track the actual access of the code snippet 510. These actual accesses are logged in a log file during execution and the program code generates an audit report 596, based on the log. Hence, the audit report 596, is a result of resource accesses and logs generated in the sandbox created by the program code 584. The program code updates the access contract 530, based on the audit report 596. Thus, the program code has a record of the impacts (e.g., accesses) of the code snippet 510. In some embodiments of the present invention, the program code alerts the user of any updates to the access contract 530, via an interface 571. The program code determines what accesses are made by the code snippet 510 in order to understand the security issues it could potentially introduce into an environment.

The results of the execution of the code snippet 510 in the sandbox are discussed above, but FIG. 5 also illustrates certain details on this execution in some embodiments of the present invention. As illustrated in FIG. 5, the program code of the sandbox creator 584, generates a virtual environment (sandbox) by installing the plan 539, and executing in the virtual environment code comprising the code snippet 510, wrapped in a jacket 595. (The creation of this jacket by the program code (jacket generator 590) is detailed in FIG. 6.). The program code wraps the code snippet 510 in a jacket 595 to monitor an execution within the sandbox environment and verify and augment the audit contract 530 for safe execution of the code snippet 510.

In some embodiments of the present invention, the program code (sandbox creator 584) initially creates the sandbox environment by installing one or more packages 564 from a package source 562. Once the environment has been created, the program code installs the plan 537, and runs the code base 592 (post build event 581) into which the code snippet 510 was injected. During runtime, because the code snippet 510 is wrapped in a jacket 595 (the jacket was generated by the program code 590), the program code can intercept any resource access and log it (e.g., in a trace). The program code transmits the trace, as an audit report 596, to the program code that comprises the access contract creator 583. The program code (access contract creator 583) either verifies or updates the access contract 530 based on the audit report 596. During runtime, the executed code base 592 (e.g., an application) can be tested with inputs with expected outputs and access patterns 566. The test data can be provided in a test data 572 computing resource. A user can participate in this test process by making inputs and monitoring activity through an interface 571.

In some embodiments of the present invention, when the access contract 530 is breached (e.g., unexpected accesses are generated) within the sandbox, user is notified, via an interface 571, and prompted, by the program code, to provide permission allowing and/or denying the breaching operation within the sandbox. This process is repeated for all test data 572. The final (updated) access contract 530 generated (post audit report 596 updates) is used as part of the snippet jacket 595 to ensure safe reuse within the target production environment. Thus, the access contract 530 is executed at runtime for safe usage of the code snippet 510.

In some embodiments of the present invention, because the (updated) snippet jacket is executed with the code snippet, when the code snippet is executed in the production environment of the target system, if the code snippet's behavior during execution is unexpected, based on the access contract (which is part of the snippet jacket), the program code notifies a user of the issue (e.g., via a user interface), so that the issue, which could be a security breach, can be addressed.

As discussed above, FIG. 6 is a combination workflow and technical architecture that provides additional details for the jacket generator 690 and the code comprising the jacket 695. The program code of the jacket generator 690 wraps the code snippet 610 (calls) with audit management code. The audit management code comprising the jacket 695 records and traces the accesses of the code snippet 610 and reports it to the program code comprising the IACDV 670 for verification and contract updates. As illustrated in FIG. 6, the program code can also updated the contents of the metadata repository 640, based on the audit report 696.

Despite being wrapper in the jacket 695, when the code snippet 610 is executed (as part of the code base) in the sandbox, the code snippet obtains input arguments 631 (instructions during runtime that call the code snippet 610). The jacket 696 starts the audit 633 upon receipt of the input arguments 631 (at which point the code snippet 610 executes) and ends the audit 634, upon completion of the execution of the code snippet 610. The jacket 695 also includes code that generates an audit report, upon completion of the audit (e.g., completion of a trace). The code snippet 610, executing within the jacket, still obtains input arguments 631 and generates output parameters 635. In this example, to initiate the audit, at audit start 633, the program code calls an audit daemon 642. The audit daemon 642 monitors system elements, including but not limited to, system security, specific files, system calls, and resource accesses. The audit daemon 642 terminates the audit upon obtaining a signal indicating the end of the audit 636.

Embodiments of the present invention include a computer-implemented method, a computer program product, and a computer system, where program code executing on one more processors identifies a partial signature in a code snippet from a source, where the code snippet identifies the source, and where the code snippet was injected into a code base to be executed in a production environment of a target computer system. The program code data mines, based on the partial signature, one or more websites and one or more source code repositories to identify and extract metadata relevant to the source. The program code generates, based on a first portion of the metadata, an installation package to install the code base for execution in a test environment of the target computing system. The program code generates, based on a second portion of the metadata, an access contract, where the access contract comprises expected accesses of the code snippet, during execution on the target system. The program code deploys the installation package in the test environment. The program code executes the code base in the test environment.

In some embodiments of the present invention, the program code monitors, at runtime, actual accesses of the code snippet. The program code generates, based on the monitoring, an audit report reflecting differences between the actual accesses of the code snippet during runtime and the expected accesses comprising the access contract.

In some embodiments of the present invention, the program code modifies the access contract, based on the audit report.

In some embodiments of the present invention, the first portion of the metadata comprises dependencies for use of the code snippet within the target computer system, and the second portion of the metadata comprises probable accesses of the code snippet during execution on the target computer system.

In some embodiments of the present invention, the source is a software development kit.

In some embodiments of the present invention, the program code monitoring the actual accesses comprises: the program code wrapping the code snippet in an audit code jacket, where the audit code jacket triggers an audit program to trace and log execution of the code snippet, and executing the code base comprises executing the code snippet with the audit code jacket.

In some embodiments of the present invention, the program code generating the audit report comprises the program code accessing the log generated by the audit program.

In some embodiments of the present invention, the program code updates the audit code jacket to comprise the modified audit report. The program code executes the code snippet with the updated audit code jacket, in the production environment.

In some embodiments of the present invention, the program code provides, to a user, via a user interface communicatively coupled to the one or more processors, an alert, during the executing, based on accesses of the code snippet executing in the production environment not conforming the access contract.

In some embodiments of the present invention, the metadata further comprises known vulnerabilities of the source.

In some embodiments of the present invention, data mined from the one or more source code repositories comprises dependencies for use of the code snippet within the target computer system, signatures of the source, and cognitive usage patterns for the code snippet, and each of the signatures of the source is selected from the group comprising: an input type, an output type, and a method name.

In some embodiments of the present invention, the program code data mining the dependencies comprises: the program code parsing the one or more source code repositories to identify configuration scripts and installation scripts; and the program code installing the identified configuration scripts and installation scripts to install the dependencies in the target system.

In some embodiments of the present invention, the program code data mining comprising: the program code pre-fetching code utilized within the code snippet, the program code identifying the dependencies in the pre-fetched code, and the program code encoding the dependencies as a fixed size vector.

In some embodiments of the present invention, the program code data mining further comprises: the program code identifying in the code snippet, descriptive information, the program code utilizing the signature and the descriptive information to crawl the one or more web pages to identity raw data associated with the source.

In some embodiments of the present invention, the raw data associated with the source is selected from the group consisting of: usage patterns, dependencies, reported vulnerabilities, security issues, and privacy issues.

In some embodiments of the present invention, the program code curates the raw data to produce at least a portion of the metadata.

Referring now to FIG. 7, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the one or more processors that execute the program code referenced in FIGS. 1-2 and 4-6, and the metadata repository 240 440 540 640 can each comprise a cloud computing node 10 (FIG. 7) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
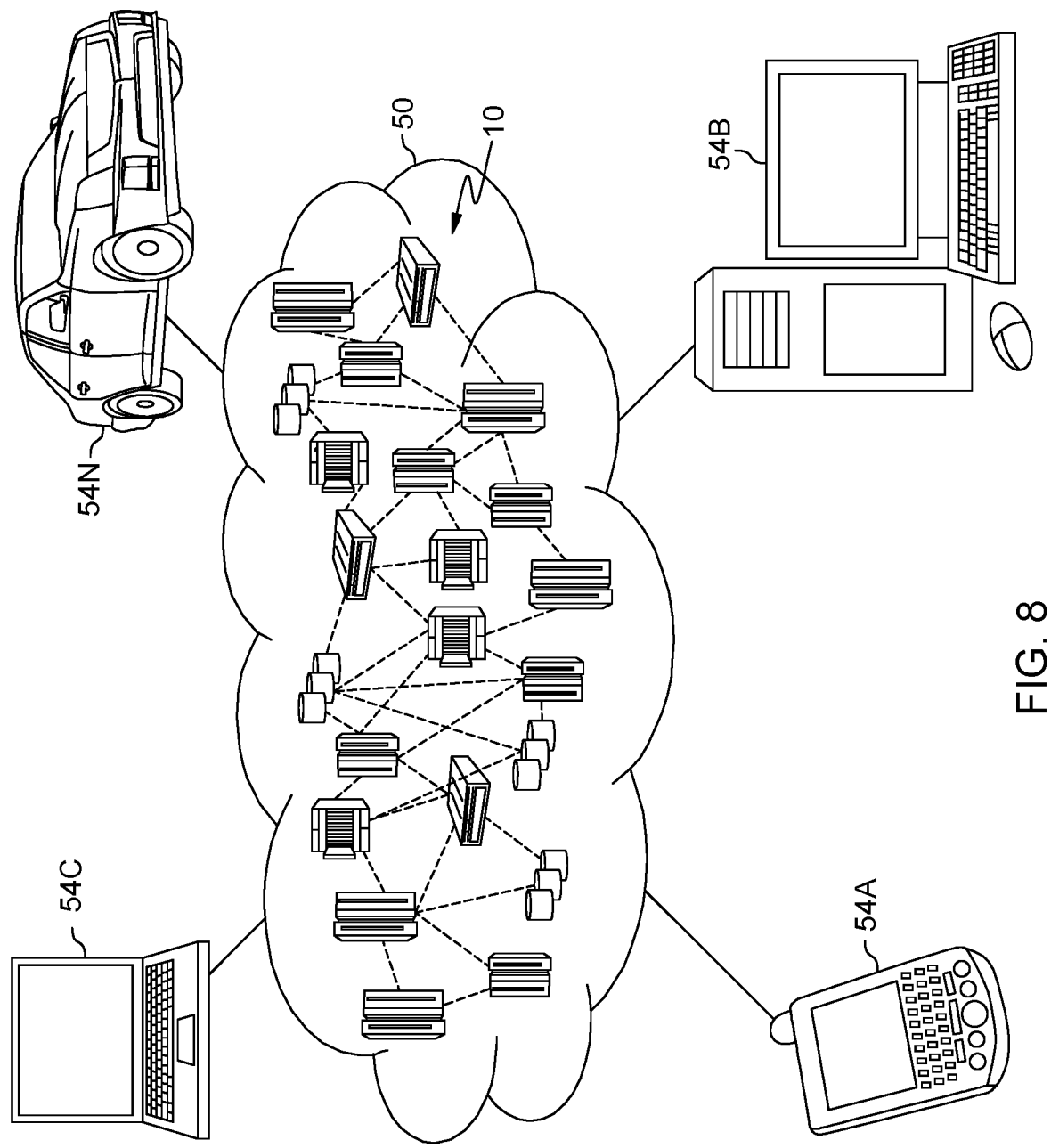
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
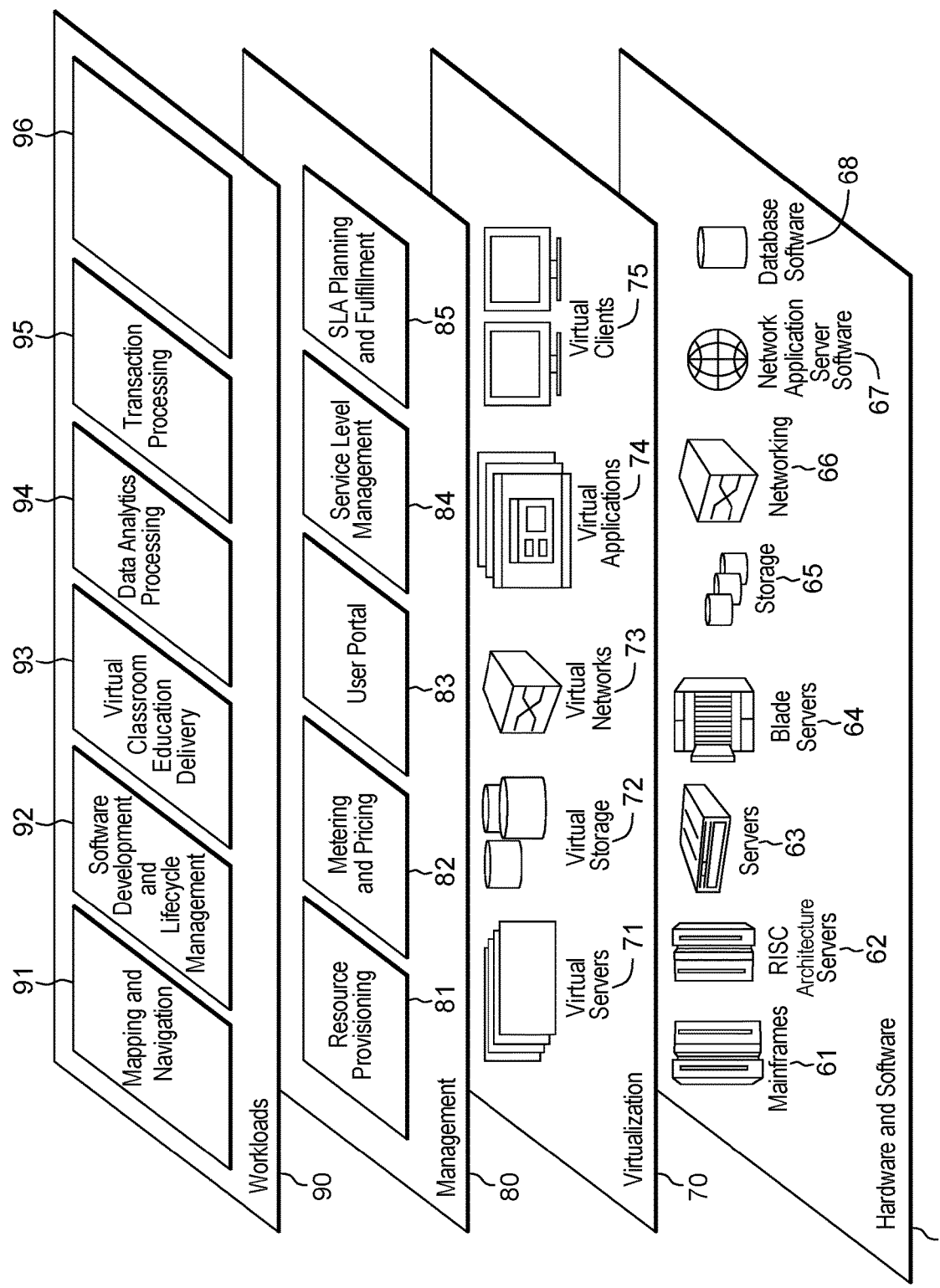
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and; and generating and implementing a security monitoring solution for third party sourced program code in a technical environment 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
   identifying, by one or more processors, a partial signature in a code snippet from a source, wherein the code snippet identifies the source, and wherein the code snippet was injected into a code base to be executed in a production environment of a target computer system;
   data mining, by the one or more processors, based on the partial signature, one or more websites and one or more source code repositories to identify and extract metadata relevant to the source;
   generating, by the one or more processors, based on a first portion of the metadata, an installation package to install the code base for execution in a test environment of the target computing system;
   generating, based on a second portion of the metadata, an access contract, wherein the access contract comprises expected accesses of the code snippet, during execution on the target system;
   deploying, by the one or more processors, the installation package in the test environment; and
   executing, by the one or more processors, the code base in the test environment.

2. The computer-implemented method of claim 1, further comprising:
   monitoring, by the one or more processors, at runtime, actual accesses of the code snippet; and
   generating, by the one or more processors, based on the monitoring, an audit report reflecting differences between the actual accesses of the code snippet during runtime and the expected accesses comprising the access contract.

3. The computer-implemented method of claim 2, further comprising:
   modifying, by the one or more processors, the access contract, based on the audit report.

4. The computer-implemented method of claim 1, wherein the first portion of the metadata comprises dependencies for use of the code snippet within the target computer system, and the second portion of the metadata comprises probable accesses of the code snippet during execution on the target computer system.

5. The computer-implemented method of claim 1, wherein the source is a software development kit.

6. The computer-implemented method of claim 3, wherein monitoring the actual accesses comprises:
   wrapping, by the one or more processors, the code snippet in an audit code jacket, wherein the audit code jacket triggers an audit program to trace and log execution of the code snippet, and wherein executing the code base comprises executing the code snippet with the audit code jacket.

7. The computer-implemented method of claim 3, wherein generating the audit report comprises accessing the log generated by the audit program.

8. The computer implemented method of claim 3, further comprising:
   updating, by the one or more processors, the audit code jacket to comprise the modified audit report; and
   executing, by the one or more processors, the code snippet with the updated audit code jacket, in the production environment.

9. The computer-implemented method of claim 8, further comprising:
   providing, by the one or more processors, to a user, via a user interface communicatively coupled to the one or more processors, an alert, during the executing, based on accesses of the code snippet executing in the production environment not conforming the access contract.

10. The computer-implemented method of claim 4, wherein the metadata further comprises known vulnerabilities of the source.

11. The computer-implemented method of claim 1, wherein data mined from the one or more source code repositories comprises dependencies for use of the code snippet within the target computer system, signatures of the source, and cognitive usage patterns for the code snippet, wherein each of the signatures of the source is selected from the group comprising: an input type, an output type, and a method name.

12. The computer-implemented method of claim 11, wherein data mining the dependencies comprises:
   parsing, by the one or more processors, the one or more source code repositories to identify configuration scripts and installation scripts; and
   installing, by the one or more processors, the identified configuration scripts and installation scripts to install the dependencies in the target system.

13. The computer-implemented method of claim 11, the data mining comprising:
   pre-fetching, by the one or more processors, code utilized within the code snippet;
   identifying, by the one or more processors, the dependencies in the pre-fetched code; and
   encoding, by the one or more processors, the dependencies as a fixed size vector.

14. The computer-implemented method of claim 11, wherein the data mining further comprises:
   identifying, by the one or more processors, in the code snippet, descriptive information; and utilizing, by the one or more processors, the signature and the descriptive information to crawl the one or more web pages to identity raw data associated with the source.

15. The computer-implemented method of claim 14, wherein the raw data associated with the source is selected from the group consisting of: usage patterns, dependencies, reported vulnerabilities, security issues, and privacy issues.

16. The computer-implemented method of claim 14, further comprising:
curating, by the one or more processors, the raw data to produce at least a portion of the metadata.

17. A computer program product comprising:
a computer readable storage medium readable by one or more processors of a shared computing environment and storing instructions for execution by the one or more processors for performing a method comprising:
identifying, by the one or more processors, a partial signature in a code snippet from a source, wherein the code snippet identifies the source, and wherein the code snippet was injected into a code base to be executed in a production environment of a target computer system;
data mining, by the one or more processors, based on the partial signature, one or more websites and one or more source code repositories to identify and extract metadata relevant to the source;
generating, by the one or more processors, based on a first portion of the metadata, an installation package to install the code base for execution in a test environment of the target computing system;
generating, based on a second portion of the metadata, an access contract, wherein the access contract comprises expected accesses of the code snippet, during execution on the target system;
deploying, by the one or more processors, the installation package in the test environment; and
executing, by the one or more processors, the code base in the test environment.

18. The computer program product of claim 17, the method further comprising:

monitoring, by the one or more processors, at runtime, actual accesses of the code snippet; and
generating, by the one or more processors, based on the monitoring, an audit report reflecting differences between the actual accesses of the code snippet during runtime and the expected accesses comprising the access contract.

19. The computer-implemented method of claim 18, the method further comprising:
modifying, by the one or more processors, the access contract, based on the audit report.

20. A computer system comprising:
a memory;
one or more processors in communication with the memory;
program instructions executable by the one or more processors in a shared computing environment via the memory to perform a method, the method comprising:
identifying, by the one or more processors, a partial signature in a code snippet from a source, wherein the code snippet identifies the source, and wherein the code snippet was injected into a code base to be executed in a production environment of a target computer system;
data mining, by the one or more processors, based on the partial signature, one or more websites and one or more source code repositories to identify and extract metadata relevant to the source;
generating, by the one or more processors, based on a first portion of the metadata, an installation package to install the code base for execution in a test environment of the target computing system;
generating, based on a second portion of the metadata, an access contract, wherein the access contract comprises expected accesses of the code snippet, during execution on the target system;
deploying, by the one or more processors, the installation package in the test environment; and
executing, by the one or more processors, the code base in the test environment.

* * * * *